US006352275B1

(12) United States Patent
Lindenkamp

(10) Patent No.: US 6,352,275 B1
(45) Date of Patent: Mar. 5, 2002

(54) WHEELCHAIR

(75) Inventor: Horst Lindenkamp, Bad Oeynhausen (DE)

(73) Assignee: Invacare Deutschland GmbH, Bad Oeynhausen (DE)

( * ) Notice: Subject to any disclaimer, the term of this patent is extended or adjusted under 35 U.S.C. 154(b) by 0 days.

(21) Appl. No.: 09/600,658

(22) PCT Filed: Jan. 22, 1999

(86) PCT No.: PCT/EP99/00397

§ 371 Date: Jul. 20, 2000

§ 102(e) Date: Jul. 20, 2000

(87) PCT Pub. No.: WO99/37265

PCT Pub. Date: Jul. 29, 1999

(30) Foreign Application Priority Data

Jan. 22, 1998 (GB) ............................................ 9801215

(51) Int. Cl.[7] ............................ B62M 1/14; B62B 3/00

(52) U.S. Cl. .................... 280/250.1; 280/650; 280/47.4

(58) Field of Search ........................... 280/250.1, 304.1, 280/650, 647, 657, 47.4; 297/DIG. 4

(56) References Cited

U.S. PATENT DOCUMENTS 4,684,149 A * 8/1987 Meyer ........................ 280/650
5,244,222 A * 9/1993 Benoit ........................ 280/647
5,301,970 A * 4/1994 Haskins ................... 280/304.1
5,727,802 A * 3/1998 Garven, Jr. et al. ...... 280/304.1
6,135,475 A * 10/2000 Brown et al. ............ 280/250.1

FOREIGN PATENT DOCUMENTS

DE 92 06 467 9/1992
EP 0 163 139 12/1989
GB 1 561 594 2/1980
GB 2 029 334 3/1980
GB 2 126 537 3/1984
NL 8 701 951 3/1989
WO 84/02647 7/1984
WO 90/04957 5/1990

* cited by examiner

*Primary Examiner*—Brian L. Johnson
*Assistant Examiner*—Matthew Luby
(74) *Attorney, Agent, or Firm*—Hudak & Shunk Co., L.P.A.

(57) ABSTRACT

A wheelchair includes two side frames (1L and 1R) consisting of respective lower frame parts (1'L and 1'R) and respective upper frame parts (1"L and 1"R). Each side frame has transverse, horizontal, tilt pivot axis (3) between its upper and lower parts. Forwards of each axis (3) is a tilt adjustment device (4) acting between the lower frame part and the upper frame part. Each device (4) may take the form of a gas spring, an electric motor or a screw device. The lower frame parts (1'L and 1'R) are linked by a pair of shear braces (5L and 5R) with a vertical pivot axis (6) in the center. The upper frame parts (1"L and 1"R) are linked by one or more pairs of transverse braces (8L and 8R) with a pivot axis (9) in the center. Seat plates are fixedly mounted at the top surfaces of the respective braces (8L and 8R). The seat plates can form the whole or part of the seat, or can be the basis for other seating elements, such as cushions and seat shells. A sling-form backrest is provided between the upper frame parts. When the tilt adjustment device (4) is operated, the upper frame parts and thus the seat and the backrest turn around the pivot axles (3) and give a desired tilt position. Independently of the tilt position, the wheelchair can be folded. This folding wheelchair has the advantage of having an occupant-operable tilt adjustment and is particularly advantageous in that the occupant can operate the tilt adjustment while seated in the wheelchair.

13 Claims, 4 Drawing Sheets

WHEELCHAIR

BACKGROUND OF THE INVENTION

The invention concerns a foldable wheelchair.

The GB 15 61 694 describes a perambulator in which the child can be transported in both lying and seated position. The perambulator comprises a frame to which the wheels and the hand grips are attached, and a seat arrangement pivotally mounted on the frame and comprising a foldable seat covering. The tilt angle is adjusted manually and fixed by means of screws. The entire perambulator is foldable, whereby it is, however, not described how the components connecting the frame are designed to facilitate folding. This construction is not transferable to wheelchairs due to stability requirements. In addition, the seat frame must be placed in upright position or removed entirely before folding the perambulator.

The GB 20 29 33 40 describes a wheelchair comprising a motor drive and especially suited for severely disabled patients who can only move their fingers. The wheelchair is not foldable, so that no information on the details of the frame construction is given. The wheels and an upper frame with a seat which is tiltable around a horizontal axis are mounted on the lower frame. A mechanical, hydraulic or pneumatic adjustment mechanism is provided between the two frames for this purpose.

The GB 21 26 537 A describes a foldable wheelchair comprising two lateral frames to which the wheels are attached. Movable connection of the two frames is effected by means of two intersecting connection braces in the central area of the frame which can be moved scissor-like around a common folding axis in their intersection point. The tilt of the seat is not adjustable.

SUMMARY OF THE INVENTION

The joint axis of these transverse braces preferably extends in direction parallel with the seat and in longitudinal direction of the wheelchair.

The seat and backrest advantageously comprise a pair of seat panels also arranged foldably. The seat plates can form the whole or part of the seat or can act as the base for other seating elements, such as cushions and seat shells.

The pair of transverse pairs is preferably designed as a single piece and connected by a pressure hinge. The pressure hinge comprises at least one stop and at least one abutment, which abut on each other in unfolded state when the transverse braces lie in one plane. This defines the final position and prevents bending.

Since the seat plates are fastened on the upper side of the transverse braces, the transverse braces are also subject to pressure from above. In unfolded state the wheelchair is stabilised by the transverse braces and the seat plates, so that no additional arrest means are needed.

A further embodiment provides that the transverse braces possess at least one stop in the pivot area on the upper frame portion, which cooperates with at least one abutment of the upper frame portion when the wheelchair is in unfolded state. This also stabilises the unfolded state of the wheelchair. These stops and abutments can be provided alone or in combination with the pressure hinge.

According to a further embodiment, the juxtaposed brace pairs connecting the upper frame are replaced by individual elements. Tilt members are mounted preferably pivotally on the lower side of the seat plates on the upper frame portion.

These tilt members advantageously comprise at least one stop in the pivot area of the frame, whereby said stop cooperates with at least one abutment of the frame when the wheelchair is in unfolded state. occupant of the wheelchair is able to cause said tilt adjustment mechanism to operate to change the degree of tilt of the upper frame means relative to the lower frame means. The tilt adjustment mechanism can also be located backwards from said pivot means.

BRIEF DESCRIPTION OF THE DRAWING

In order that the invention may be clearly understood and readily carried into effect, reference will now be made, by way of example, to the accompanying drawings, in which.

DETAILED DESCRIPTION OF THE INVENTION

Figure 1:
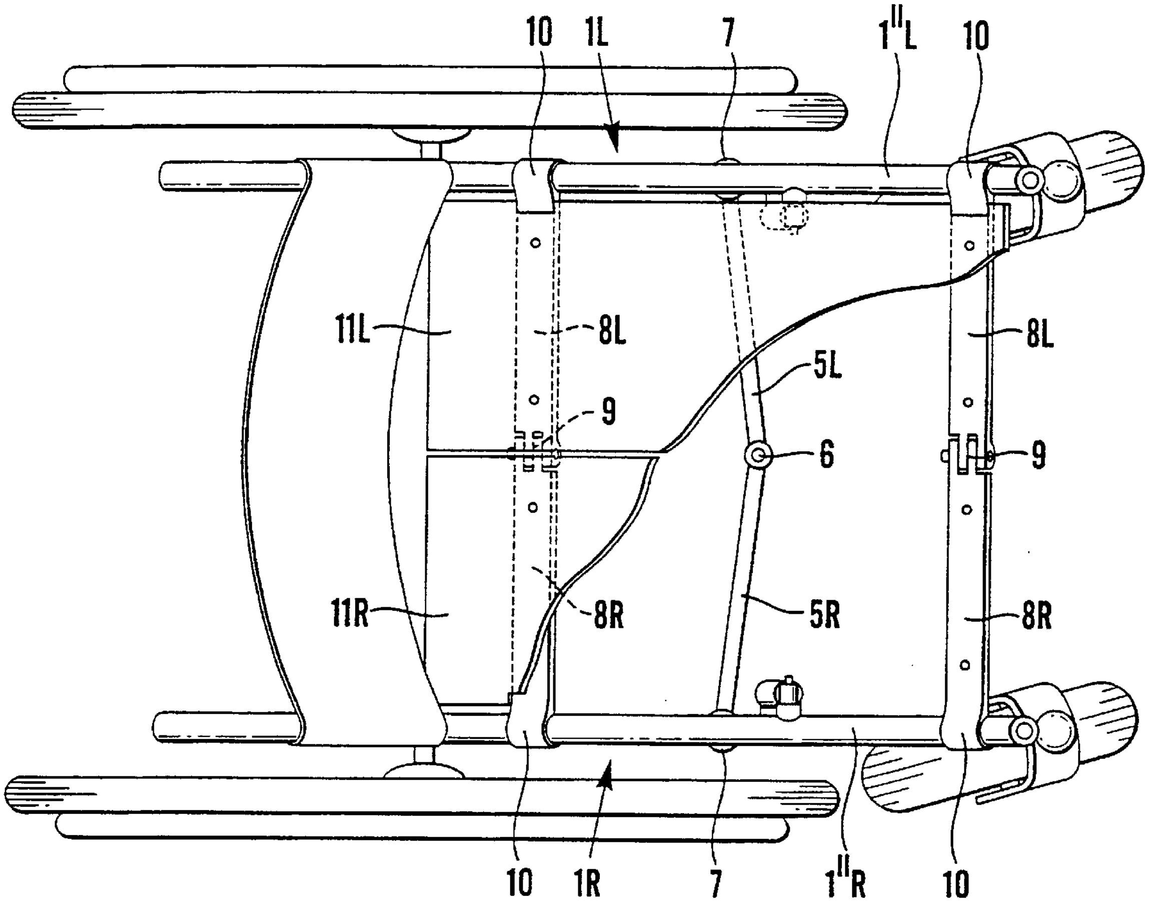
FIG. 1 is a fragmentary top plan view of a wheelchair.
Figure 2:
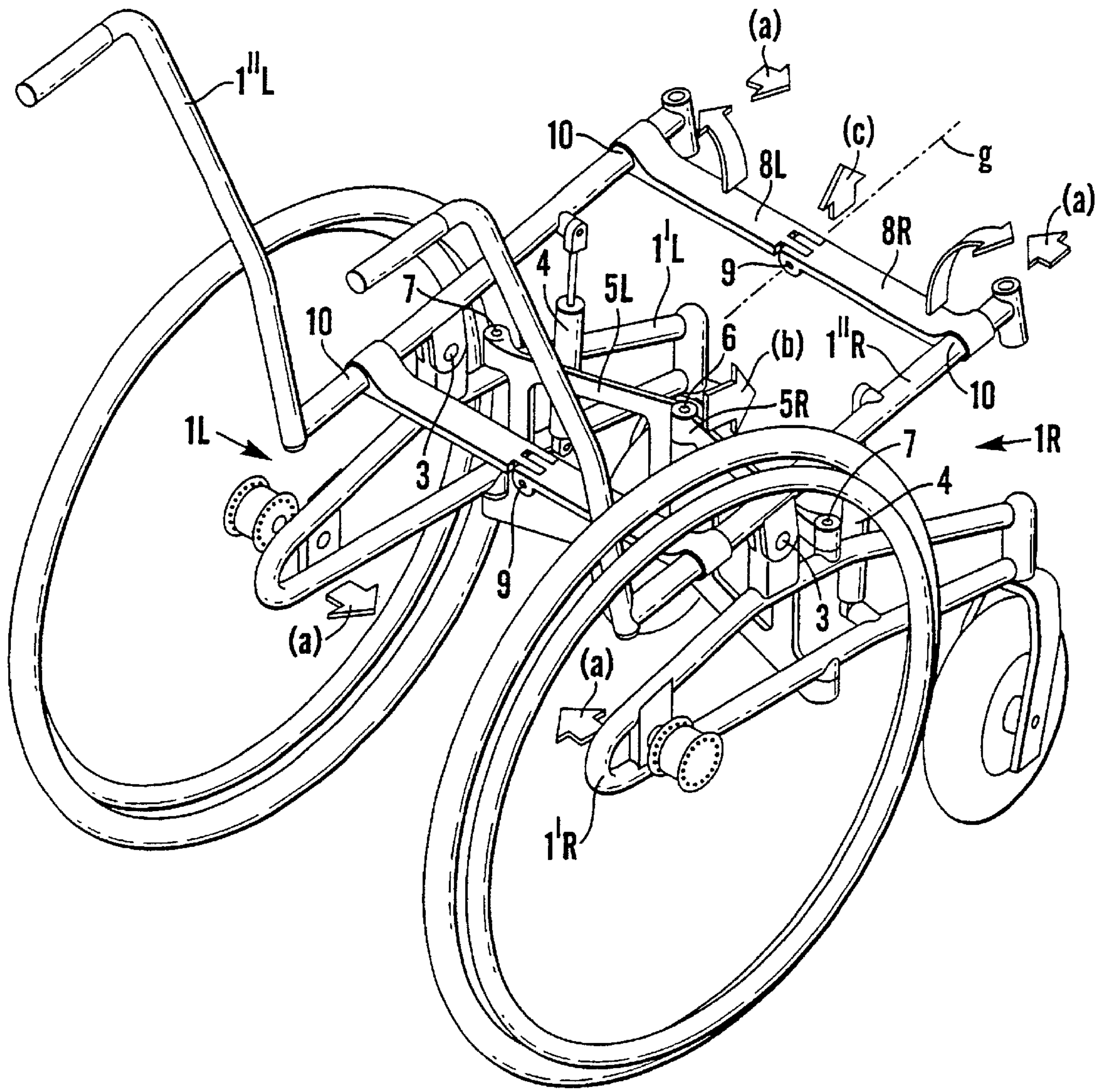
FIG. 2 is a perspective view of the wheelchair but with seat plates and a backrest removed for clarity of illustration, FIGS. 3*a,b* a side plan view and a perspective view of the seat braces, FIGS. 4*a,b* a side plan view and a perspective view of seat brace means according to another embodiment.

Referring to the drawings, the wheelchair includes two side frames 1 (namely, a left-hand frame 1L and a right-hand frame 1R) consisting of respective lower frame parts 1' (namely, a left-hand lower frame part 1'L and a right-hand lower frame part 1'R) and respective upper frame parts 1" (namely, a left-hand upper frame part 1"L and a right-hand upper frame part 1"R). Each side frame 1 has a transverse, horizontal, tilt pivot axis 3 between its upper and lower parts 1" and 1'. Forwards of each axis 3 is a tilt adjustment device 4 acting between the lower frame part 1' and the upper frame part 1". Each mechanism 4 may take the form of a gas spring or an electric motor (giving continuous adjustability) or of a screw or clamp device, such being manually remotely operable, for example by means of a press button, by the occupant of the wheelchair, or may be a screw device (giving continuous operability). The lower frame parts 1'L and 1'R are linked by a pair of shear braces 5, consisting of a left-hand brace 5L and a right-hand brace The folding wheelchair described with reference to the drawings has the advantage of having an occupant-operable tilt adjustment and is particularly advantageous in that the occupant can operate the tilt adjustment while seated in the wheelchair.

Figure 3A:
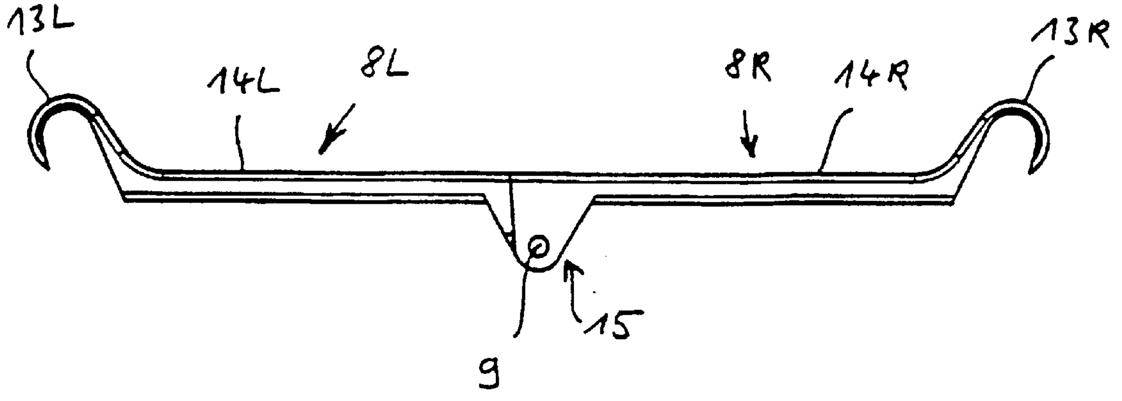
Figure 3B:
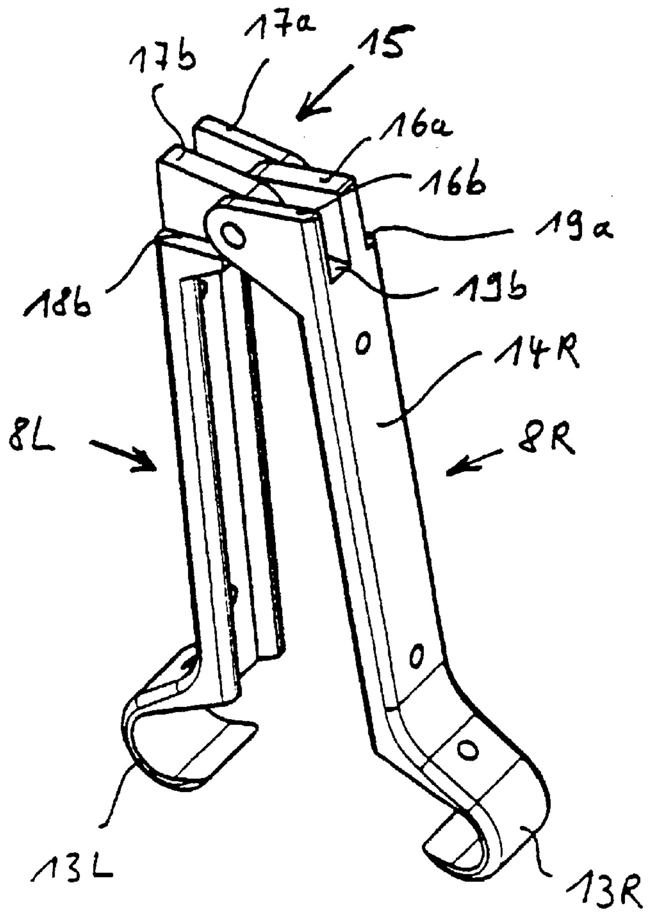

In FIGS. 3*a* and 3*b* the transverse braces 8L,8R are shown in enlargement. FIG. 3*a* shows the transverse brace pair in unfolded state; FIG. 3*b* shows the same in folded state.

The transverse braces 8L and 8R respectively comprise a pivot hook 13L and 13R on their outer ends, whereby said hook pivotally attaches the transverse braces 8L and 8R on the upper frame portion 1"L and 1"R. The two seat plates 1L and 11R not shown in the Figure are mounted on the surfaces 14L and 14R of the transverse braces 8L and 8R. The transverse braces 8L and 8R are connected with each other by an integrated pressure hinge 15 comprising the pivot axis 9. The pressure hinge 15 is formed in such manner that the position of the two transverse braces 8L,8R shown in FIG. 3*a* is stable. The pressure hinge 15 prevents bending of the transverse brace pair 8L,8R even under pressure.

For this purpose, several stops and abutments are provided, as shown in FIG. 3*b*. Each transverse brace 8L and 8R comprises stop surfaces 16*a,b* and 17*a,b* in the hinge area and corresponding abutment surfaces 18*a,b* and 19*a,b*. When the two transverse braces 8L,8R are converted into extended, unfolded state as shown in FIG. 3*a,* the stop surfaces 16*a,b* abut on the abutment surfaces 18*a,b*. The same applies to stop surfaces 17*a,b* which cooperate with the abutment surfaces 19*a,b*. In this way, a stable position of the transverse braces 8L and 8R is ensured without additional auxiliary means, whereby the whole wheelchair is simultaneously stabilized.

Figure 4A:
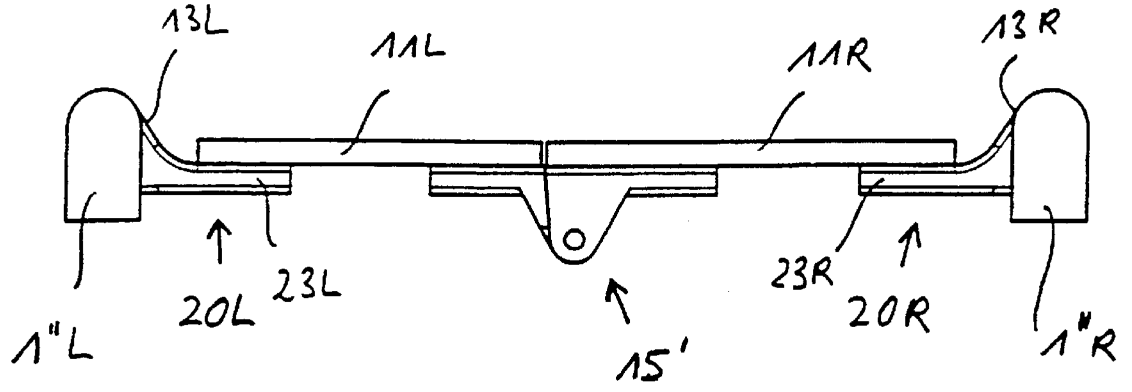
Figure 4B:
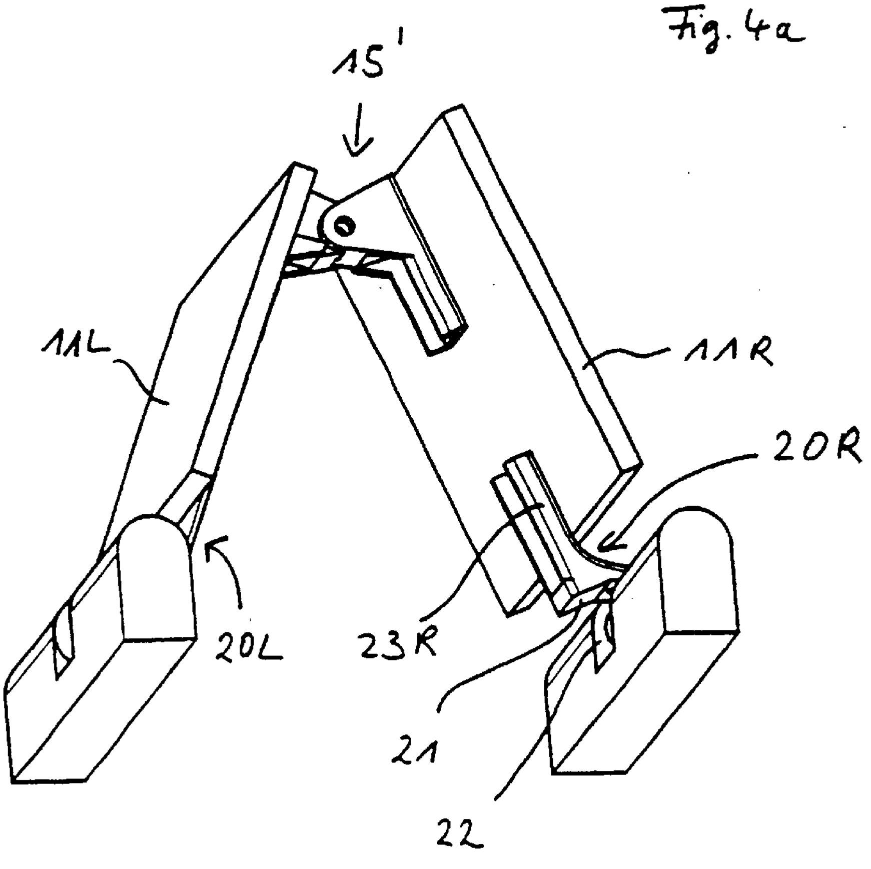

FIGS. 4*a* and 4*b* show a further embodiment. Whereas in FIGS. 3*a* and 3*b* the pivot hooks 13L and 13R and the pressure hinge 15 are integral components of the transverse braces 8L and 8R, the embodiment shown in FIGS. 4*a* and 4*b* consists List of Reference Numerals

1L left hand frame
1R right hand frame
1'L lower frame part
1'R lower frame part
1"L upper frame part
1"R upper frame part
3 tilt pivot axis
4 tilt adjustment device
5 pair of shear braces
5L left hand brace
5R right hand brace
6 vertical pivot axis
7 vertical pivot axis
8 pair of transverse braces
8L left hand transverse brace
8R right hand transverse brace
9 pivot axis
10 pivot axis
11L left hand seat plate
11R right hand seat plate
12 sling-form backrest
13L pivot hook
13R pivot hook
14L surface
14R surface
15 pressure hinge
15'pressure hinge
16*a,b* stop surface
17*a,b* stop surface

What is claimed is:

1. A wheelchair comprising lower frame means and upper frame means tiltable backwards and forwards relative to said lower frame means, ground wheels mounted on said lower frame means, and seating and backrest means carried by said upper frame means, wherein said upper frame means includes at least one pair of transverse braces pivotally interconnected end-to-end and foldable around the pivotal interconnection and wherein said lower frame means include at least one pair of transverse braces pivotally interconnected end-to-end and foldable around their pivotal interconnection, so that said frame means are foldable inwards transversely of the wheelchair, substantially irrespective of the tilt position of said upper frame means, characterized in that the full length of said at least one pair of transverse braces of the lower frame means is greater than the width of the wheelchair in unfolded state defined by the at least one pair of transverse braces of the upper frame means or the seat plates included in the seating and backrest means.

2. A wheelchair according to claim 1, wherein said seating and backrest means (11L, 11R, 12) include a flexible backrest (12).

3. A wheelchair according to claim 1, wherein said pivotal interconnection of said pair of transverse braces of the upper frame means has a pivot axis being oriented in parallel with the seat surface.

4. A wheelchair according to claim 3, wherein said pair of transverse braces of the upper frame means is provided as a single piece and connected by a pressure hinge.

5. A wheelchair according to claim 4, wherein said transverse braces of the upper frame means comprise at least one stop in the pivot area and said stop cooperates with at least one abutment of the upper frame portion when the wheelchair is in unfolded state.

6. A wheelchair according to claim 5, wherein said seating and backrest means include a pair of seat plates pivotally interconnected edge-to-edge and foldable around their pivotal interconnection.

7. A wheelchair according to claim 6, wherein said seat plates are mounted on the transverse braces of the upper frame means.

8. A wheelchair according to claim 1, wherein pivot members which pivotally rest on the upper frame portion are mounted on the lower side of the seat plates included in said seating and backrest means.

9. A wheelchair according to claim 8, wherein said pivot members comprise a stop in the pivot area of the upper frame portion, which cooperates with an abutment of the frame portion when the wheelchair is in unfolded state.

10. A wheelchair according to claim 8, wherein a pressure hinge which connects the two seat plates is mounted on the lower side of the seat plate.

11. A wheelchair according to claim 10, wherein said pivotal interconnection of said pair of transverse braces of said lower frame means has a substantially vertical pivot axis.

12. A wheelchair according to claim 11, wherein said pivot axes are disposed perpendicularly to each other if the upper frame means are not tilted.

13. A wheelchair according to claim 12, wherein transverse, horizontal pivot means interconnect said upper frame means and said lower frame means, so that said upper frame means is tiltable around a horizontal axis relative to said lower frame means and a tilt adjustment mechanism is located forwards from said pivot means, an occupant of the wheelchair being able to cause said tilt adjustment mechanism to operate to change the degree of tilt of the upper frame means relative to the lower frame means.

* * * * *